US011447879B2

(12) United States Patent
Amini Horri et al.

(10) Patent No.: US 11,447,879 B2
(45) Date of Patent: Sep. 20, 2022

(54) HYDROGEN GENERATOR

(71) Applicant: UNIVERSITY OF SURREY, Guildford (GB)

(72) Inventors: Bahman Amini Horri, Guildford (GB); Sai Gu, Guildford (GB)

(73) Assignee: UNIVERSITY OF SURREY, Guildford (GB)

(*) Notice: Subject to any disclaimer, the term of this patent is extended or adjusted under 35 U.S.C. 154(b) by 0 days.

(21) Appl. No.: 16/626,728

(22) PCT Filed: Jun. 26, 2018

(86) PCT No.: PCT/GB2018/051778
§ 371 (c)(1),
(2) Date: Dec. 26, 2019

(87) PCT Pub. No.: WO2019/002841
PCT Pub. Date: Jan. 3, 2019

(65) Prior Publication Data
US 2020/0115806 A1 Apr. 16, 2020

(30) Foreign Application Priority Data
Jun. 27, 2017 (GB) ...................................... 1710224

(51) Int. Cl.
C25B 1/04 (2021.01)
C25B 9/17 (2021.01)
C25B 15/023 (2021.01)

(52) U.S. Cl.
CPC ................ C25B 1/04 (2013.01); C25B 9/17 (2021.01); C25B 15/023 (2021.01)

(58) Field of Classification Search
CPC ................ C25B 1/04; C25B 9/17; C25D 9/19
USPC ................................... 205/628–639
See application file for complete search history.

(56) References Cited

U.S. PATENT DOCUMENTS

| 3,410,770 | A | 11/1968 | Buechler |
| 4,180,623 | A | 12/1979 | Adams |
| 4,737,249 | A | 4/1988 | Shepard, Jr. et al. |
| 9,067,186 | B2* | 6/2015 | Carey ................. C01B 13/0203 |
| 2008/0190781 | A1* | 8/2008 | Huang ................. C01B 3/0031 205/639 |

(Continued)

FOREIGN PATENT DOCUMENTS

| CN | 101570865 A | 11/2009 |
| CN | 105463497 A | 4/2016 |

(Continued)

OTHER PUBLICATIONS

Search Report under Section 17(5) dated Dec. 20, 2017, in United Kingdom Patent Application No. GB1710224.5, 5 pages.

(Continued)

Primary Examiner — Brian W Cohen
(74) Attorney, Agent, or Firm — Squire Patton Boggs (US) LLP

(57) ABSTRACT

The disclosure relates to an electrolysis cell for producing hydrogen. The cell comprises an electrolyte compartment and an electrolyte disposed therein. The electrolyte comprises an aqueous alkaline solution comprising a transition metal ion or p block metal ion. The cell further comprises first and second spaced apart electrodes at least partially disposed in the electrolyte.

20 Claims, 7 Drawing Sheets

(56) References Cited

U.S. PATENT DOCUMENTS

| | | |
|---|---|---|
| 2014/0034485 A1 | 2/2014 | Krebs et al. |
| 2015/0203976 A1 | 7/2015 | Noaki et al. |
| 2016/0017507 A1 | 1/2016 | Dai et al. |
| 2016/0149231 A1 | 5/2016 | Melman et al. |

FOREIGN PATENT DOCUMENTS

| | | | |
|---|---|---|---|
| CN | 106319558 | 1/2017 | |
| DE | 1667366 A1 | 7/1971 | |
| JP | 2016-204743 A | 12/2016 | |
| WO | WO 2009/127145 A | 10/2009 | |
| WO | WO 2009/127145 A1 | 10/2009 | |
| WO | WO 2015-056641 A | 4/2015 | |
| WO | WO-2017115269 A1 * | 7/2017 | ............ H01M 14/00 |

OTHER PUBLICATIONS

Search Report under Section 17(6) for claim 27 dated Feb. 26, 2018, in United Kingdom Patent Application No. GB1710224.5, 3 pages.

Search Report under Section 17(6) for claims 29-32 dated Feb. 26, 2018, in United Kingdom Patent Application No. GB1710224.5, 3 pages.

International Search Report and Written Opinion dated Nov. 2, 2018, in International Patent Application No. PCT/GB2018/051778, 17 pages.

Einerhand et al., "Hydrogen production during zinc deposition from alkaline zincate solutions", J Appl Electrochem. Nov. 1988; 18(6): 799-806.

Horri et al., "A highly efficient hydrogen generation electrolysis system using alkaline zinc hydroxide solution", Int J Hydrog Energy. Mar. 2018; pp. 1-10.

Perovic et al., "Efficient hydrogen production using ternary Ni—Cu—Mo ionic activator", Int J Hydrog Energy. May 25, 2015; 40(19): 6270-6275. Epub Apr. 7, 2015.

Thomas et al., "Revisiting zinc passivation in alkaline solutions", Electrochimica Acta. May 1, 2013; 97: 192-201.

Cinese Office Action for China Patent Application No. CN 201880043094.7, 11 pages, dated Aug. 3, 2022.

* cited by examiner

Rate of hydrogen production vs concentrations at different voltages

HYDROGEN GENERATOR

CROSS REFERENCE TO RELATED APPLICATIONS

This application is the U.S. National Stage of International Application No. PCT/GB2018/051778, filed Jun. 26, 2018, which claims the benefit of United Kingdom Application No. 1710224.5, filed Jun. 27, 2017, the contents of which are hereby incorporated by reference in their entireties.

The present invention relates to electrochemical cells comprising an electrolyte for producing hydrogen gas. In particular, the invention describes an electrolyte comprising an aqueous alkaline solution with a transition metal ion or p block metal ion dissolved therein. The invention extends to an apparatus for generating and storing hydrogen gas, uses of the electrolyte per se and to a method of producing hydrogen gas.

Hydrogen is an important energy carrier and has the potential to replace hydrocarbon based fuels for sustainable development [1]. The current energy related problems with hydrocarbon fuels, such as air pollution, climate change and scarcity of the resource, are important motivations for exploring hydrogen. As an alternative fuel source, hydrogen has the highest specific energy content of all fuels, and can be used for clean power generation in fuel cells with limited or no net atmospheric emissions and is convenient for efficient energy storage [2]. Hydrogen can be used directly as a transportation fuel yielding a higher energy efficiency which is receiving much favourable attention as a technical and political issue [3].

Currently, several industrial methods of hydrogen production exist, and among these are reforming, photoconversion and electrolysis, which have gained prominence. Their pros and cons have been discussed [4]. Water electrolysis provides the cleanest solution for hydrogen production. Its advantages are (i) it gives zero carbon emissions; (ii) it produces pure hydrogen, influencing fuel cell technology which is heavily affected by impurities in the hydrogen feed; (iii) it is independent of hydrocarbon resources; (iv) it can be operated in small scale plants; and (v) renewable energy can be used to produce the hydrogen [5].

The electrolytic process of water decomposition is technologically simple and there are many techniques concerning the water electrolysis process, such as alkaline electrolysis, polymer electrolyte membrane (PEM) and solid oxide electrolysis cells (SOEC). A growing issue concerning electrolytic processes are the high energy requirement, cost of installation and low safety, durability and energy efficiency [6]. Some electrolysers especially PEM are highly sensitive to the purity of water, additional water processing must be applied before electrolysis [6]. Therefore intense research efforts go into improving operational conditions including aspects of electrochemical activity of the electrode and electrolyte and reducing total resistance of the electrolysis cell.

In accordance with a first aspect of the invention, there is provided an electrolysis cell for producing hydrogen, the cell comprising an electrolyte compartment; an electrolyte disposed in the electrolyte compartment, wherein the electrolyte comprises an aqueous alkaline solution comprising a transition metal ion or p block metal ion; and first and second spaced apart electrodes at least partially disposed in the electrolyte.

Advantageously, the electrolysis cell is configured to produce hydrogen efficiently when a voltage is applied across the first and second electrodes. For instance, as explained in the examples, the inventors were able to produce hydrogen at low voltages and reduce the energy per mass unit of hydrogen produced by a factor of between 2 and 4 compared to conventional water electrolysis systems.

It may be appreciated that the transition metal or p clock metal ion may equilibrate with the alkaline solution. For instance, as explained in the examples, it is thought that zinc hydroxide $Zn(OH)_2$ in alkaline solution can equilibrate so that the following species may be present $Zn^{2+}_{(aq)}$, $Zn(OH)^{+}_{(aq)}$, $Zn(OH)_{2(aq)}$, $Zn(OH)_{3}^{-}{}_{(aq)}$ and $Zn(OH)_{4}^{2-}$. Accordingly, the concentration of the transition metal ions may be understood to refer to the concentration of the transition metal ions per se and the transition metal ions complexed with other elements of the electrolyte, such as hydroxide ions.

The first and second electrodes may independently comprise a carbon based electrode or a metal based electrode. The or each carbon based electrode may comprise graphite. The or each metal based electrode may comprise chromium, nickel, zinc, cadmium, copper, tin, lead, rhodium, platinum, gold, palladium, iridium, osmium, rhenium, ruthenium, germanium, beryllium, and/or silver. Alternatively, the or each metal based electrode may comprise an alloy, such as brass or bronze. Most preferably, the electrodes comprise graphite or zinc. In one embodiment, both the first and second electrode comprises graphite. In another embodiment, both the first and second electrode comprises zinc.

In a preferred embodiment, at least one of the electrodes comprises at least a layer of a transition metal or p block metal which is the same metal as the transition metal ion or p block metal ion in the electrolyte.

The electrodes may have a substantially smooth surface. However, in a preferred embodiment, the electrodes have a substantially textured or porous surface. Advantageously, a textured or porous surface increases the surface area of the electrodes.

Preferably, the aqueous alkaline solution comprises an Arrhenius base, a Lewis base, or a Bronsted-Lowry base, more preferably a strong Arrhenius base or a Lewis superbase. The Arrhenius base may comprise an alkali metal or alkaline earth metal hydroxide. The Arrhenius base may comprise potassium hydroxide, sodium hydroxide, barium hydroxide, caesium hydroxide, strontium hydroxide, calcium hydroxide, lithium hydroxide and/or rubidium hydroxide.

The Lewis base may comprise butyllithium (n-BuLi), lithium diisopropylamide (LDA), lithium diethylamide (LDEA), sodium amide, sodium hydride (NaH) or lithium bis(trimethylsilyl)amide.

The Bronsted-Lowry base may comprise ammonium hydroxide, an aliphatic amine, or an aromatic amine. The aliphatic amine may comprise methylamine, ethylamine or dimethylamine. The aromatic amine may comprise aniline, phenylenediamine or o-toludine.

In a preferred embodiment, the aqueous alkaline solution comprises an Arrhenius base. Preferably, the ratio of the hydroxide concentration to the transition metal ion or p block metal ion concentration is between 2:1 and 5:1, more preferably between 3:1 and 40:1, between 4:1 and 30:1 or between 5:1 and 25:1, and most preferably between 10:1 and 20:1.

In one embodiment, the Arrhenius base is sodium hydroxide. The ratio of hydroxide concentration to the transition metal ion or p block metal ion concentration is preferably between 2:1 and 50:1, more preferably between 3:1 and 4:1, between 4:1 and 30:1 or between 5:1 and 20:1, and most preferably between 10:1 and 15:1. The inventors have found that when preparing an electrolyte by adding zinc oxide to sodium hydroxide solution, the optimum ratio was about 10:1 (NaOH:ZnO). However, as explained in equations 1 and 2 in the examples, adding zinc oxide to sodium hydroxide solution causes two further hydroxide ions to be produced. Accordingly the optimum ratio in the solution is about 12:1 ($OH^-:Zn^{2+}$).

In one embodiment, the strong Arrhenius base is potassium hydroxide. The ratio of hydroxide concentration to the transition metal ion or p block metal ion concentration is preferably between 2:1 and 5:1, more preferably between 3:1 and 4:1, between 4:1 and 3:1 or between 10:1 and 25:1, and most preferably between 15:1 and 20:1. The inventors have found that when preparing an electrolyte by adding zinc oxide to potassium hydroxide solution, the optimum ratio was about 15:1 (NaOH:ZnO). However, it will be appreciated that adding zinc oxide to potassium hydroxide solution causes two further hydroxide ions to be produced. Accordingly the optimum ratio in the solution is about 17:1 ($OH^-:Zn^{2+}$).

Preferably, the pH of the aqueous alkaline solution at 20° C. is at least 9, more preferably at least 10 or at least 11, and most preferably, at least 11.5. Preferably, the pH of the aqueous alkaline solution at 20° C. is between 9 and 14, more preferably between 10 and 13.5 or between 11 and 13, and most preferably between 11.5 and 12.5.

In a one embodiment, the aqueous alkaline solution comprises potassium hydroxide, and the pH at 20° C. is preferably at least 9, more preferably at least 10 or at least 11, and most preferably, at least 11.5. Preferably, the aqueous alkaline solution comprises potassium hydroxide, and the pH at 20° C. is between 10 and 14, more preferably between 11 and 13.5 or between 11.32 and 13.04, and most preferably between 11.63 and 12.01.

In an alternative embodiment, the aqueous alkaline solution comprises sodium hydroxide, and the pH at 20° C. is preferably at least 10, more preferably at least 11 or at least 11.5, and most preferably, at least 12. Preferably, the aqueous alkaline solution comprises sodium hydroxide, and the pH at 20° C. is between 11 and 13.5, more preferably between 11.5 and 13 or between 11.71 and 12.62, and most preferably between 12.38 and 12.52.

The transition metal ion may comprise a zinc ion, a copper ion, an iron ion, a nickel ion, a cobalt ion, a chromium ion, a cadmium ion, a vanadium ion, a titanium ion, a yttrium ion, a zirconium ion and/or a scandium ion. Preferably, the transition metal ion comprises $Zn^{2+}$, $Cu^+$, $Cu^{2+}$, $Ni^{2+}$, $Co^{2+}$, $Co^{3+}$, $Cr^{2+}$, $Cr^{3+}$, $Cr^{6+}$, $Cd^{2+}$, $V^{5+}$, $Ti^{2+}$, $Ti^{3+}$, $Ti^{4+}$, $Fe^{2+}$, $Fe^{3+}$, $Fe^{6+}$, $Y^{3+}$, $Zr^{4+}$ and/or $Sc^{3+}$. The p block metal ion may comprise an aluminium ion, a tin ion or a lead ion. Preferably, the p block metal ion comprises $Pb^{2+}$, $Al^{3+}$, $Sn^{2+}$ and/or $Sn^{4+}$. As explained above, the transition metal ion or p block metal ions may complex with other components of the electrolyte. Accordingly, the electrolyte may comprise zinc hydroxide, zincate, plumbate (II), tetrahydroxocuprate (II), copper (II) hydroxide, ferrate, yttriate, zirconate and/or scandiate. Preferably, the electrolyte comprises zinc hydroxide, sodium zincate, potassium zincate, sodium plumbate (II), potassium plumbate (II), sodium tetrahydroxocuprate (II), potassium tetrahydroxocuprate (II), sodium copper (II) hydroxide, potassium copper (II) hydroxide, sodium ferrate, potassium ferrate, barium ferrate, sodium yttriate, potassium yttriate, sodium zirconate, potassium zirconate, sodium scandiate and/or potassium scandiate. Most preferably, the electrolyte comprises zinc hydroxide, sodium zincate and/or potassium zincate.

Preferably, the concentration of the transition metal ion or p block metal ion in the electrolyte is between 0.01 M and 1.2 M, more preferably between 0.05 M and 1 M or between 0.1 M and 0.8 M, and most preferably between 0.15 M and 0.6 M or between 0.2 M and 0.4 M.

In one embodiment, the electrolyte comprises sodium zincate and the concentration of the zinc ion is between 0.01 M and 0.6 M, more preferably between 0.1 M and 0.4 M or between 0.15 M and 0.3 M, and most preferably between 0.2 M and 0.25 M.

In one embodiment, the electrolyte comprises potassium zincate and the concentration of the zinc ion is between 0.01 M and 1.2 M, more preferably between 0.1 M and 0.6 M or between 0.2 M and 0.5 M, and most preferably between 0.25 M and 0.45 M.

In one embodiment, the electrodes comprise graphite and the electrolyte comprises potassium zincate and the concentration of the zinc ion is between 0.01 M and 1.2 M, more preferably between 0.1 M and 0.6 M or between 0.2 M and 0.4 M, and most preferably between 0.25 M and 0.35 M.

In one embodiment, the electrodes comprise zinc and the electrolyte comprises potassium zincate and the concentration of the zinc ion is between 0.01 M and 1.2 M, more preferably between 0.2 M and 0.6 M or between 0.3 M and 0.5 M, and most preferably between 0.35 M and 0.45 M.

In some embodiments, the electrolysis compartment may comprise an undivided cell. Accordingly, the electrolysis compartment may not comprise an ion-permeable membrane between the anode and the cathode which divides the electrolysis compartment into an anolyte compartment and a separate catholyte compartment.

In alternative embodiments, the electrolysis compartment may comprise a divided cell. Accordingly, the electrolysis compartment may comprise an ion-permeable membrane between the anode and the cathode which divides the electrolysis compartment into an anolyte compartment and a separate catholyte compartment. The permeable membrane may comprise a ceramic membrane or a polymer membrane. The ceramic membrane may comprise magnesium oxide, beryllium oxide, magnesium aluminate, yttria-stabilized zirconia or gadolinia-doped ceria. The polymer membrane may comprise polyethylene, polypropylene, Nafion, polytriphenylamine or polyvinylidene fluoride (PVDF). Advantageously, the separator would allow the electrodes to be positioned closer together and have a higher surface area, and would therefore increase the efficiency of the cell.

The electrolysis cell may comprise a power supply configured to apply a voltage across the first and second electrodes. The power supply may comprise a battery, a generator, a renewable power source or it could comprise the national grid. The renewable power source may comprise a solar power generator, wind power or a hydropower generator.

The power supply may be configured to supply a direct current to the electrodes. The electrolysis cell may comprise a control system configured to monitor the current flowing through the electrodes. If the control system detects that the current has fallen below a predetermined level, it may be configured to switch the direction of the current.

Alternatively, the power supply may be configured to apply an alternating or oscillating current to the electrodes. The current may oscillate or alternate at a frequency between 0.1 mHz and 100 Hz. Advantageously, if the power supply supplies an alternating or oscillating current then the electrodes will continuously switch between anode and cathode, thereby preventing a large deposition of the transition metal on the cathode.

The power supply may be configured to apply the alternating or oscillating current in the form of a sine wave, triangle wave, sawtooth wave or square wave.

The power supply may be configured to apply the alternating or oscillating current at between 0.01 Hz and 100 Hz, preferably between 0.05 Hz and 50 Hz and most preferably between 0.1 Hz and 10 Hz. Preferably, the power supply is configured to apply the alternating or oscillating current in the form of a sine wave.

For lower frequencies, preferably the power supply is configured to apply the alternating or oscillating current in the form of a square wave. Advantageously, a square wave will not cause a delay due to time elapsing to get over the potential voltage required to start the redox reaction.

Accordingly, in an alternative embodiment, the power supply may be configured to apply an alternating or oscillating current to the electrodes in the form of a square wave, and the current may oscillate or alternate at a frequency between 0.1 mHz and 1 Hz, preferably between 0.2 mHz and 50 mHz or between 0.5 mHz and 20 mHz, more preferably between 0.5 mHz and 10 mHz, between 0.8 mHz and 8 mHz, between 1 mHz and 5 mHz, and most preferably between 1.5 mHz and 3.5 mHz.

The electrolysis cell may comprise an electronic switching device configured to switch the direction of the current after a predetermined interval. The predetermined interval may be between 1 second and 2 hours, preferably between 30 seconds and 1 hour or between 1 minute and 30 minutes, more preferably between 2 minutes and 25 minutes, between 3 minutes and 20 minutes or between 4 minutes and 15 minutes, and most preferably between 5 minutes and 10 minutes.

The power supply may be configured to apply a voltage of between 1 V and 6 V, preferably between 1.5 V and 3 V, and most preferably between 2 and 2.5 V.

The electrolysis cell of the first aspect could form part of an apparatus for generating and storing hydrogen.

Accordingly, in accordance with a second aspect, there is provided an apparatus for generating and storing hydrogen, the apparatus comprising the electrolysis cell of the first aspect, a chamber for hydrogen gas storage and a conduit configured to feed hydrogen gas from the cell to the chamber.

Advantageously, the apparatus provides a small-scale hydrogen generator and store.

Preferably, the apparatus comprises a conduit configured to allow fluid communication between the cell and the atmosphere. Preferably, the conduit comprises a valve. The valve may comprise a solenoid valve. Advantageously, the valve allows the electrolyte solution or water to be added to the cell. The valve also allows the cell to vent oxygen to the atmosphere.

Preferably, the conduit configured to feed hydrogen from the cell to the chamber comprises a valve. The valve may comprise a solenoid valve. Advantageously, the valve ensures that the chamber is only fluidly connected to the cell when the cell is producing substantially pure hydrogen.

Preferably, the chamber comprises a first portion and a second portion, wherein the first portion is fluidly connected to the second portion. Preferably, the chamber comprises a liquid and is configured to allow the liquid to flow between the first and second portions. Preferably, the first portion comprises a first gas and the second portion comprises a second gas. Preferably, the first gas is hydrogen gas. Preferably, the second gas is air. Preferably, the chamber is configured to prevent the first gas in the first portion from exchanging with the second gas in the second portion.

Preferably, the ratio of the volume of the first portion to the volume of the second portion is between 1:2 and 2:1, more preferably between 1:1.5 and 1.5:1, and most preferably between 1:1.1 and 1.1:1. In a most preferred embodiment, the volume of the first portion is substantially equal to the volume of the second portion.

Preferably, the liquid fills between 10% and 90% of the volume of the chamber, more preferably between 20% and 80%, between 30% and 70% or between 40% and 60% of the volume of the chamber, and most preferably between 45% and 55% the volume of the chamber. In a most preferred embodiment, the liquid fills about 50% of the volume of the chamber.

The liquid may comprise oil or water, and preferably water. Advantageously, very little hydrogen gas will dissolve in water.

Preferably, the conduit configured to feed hydrogen from the cell and to the chamber is configured to feed hydrogen from the cell and to the first portion of the chamber.

Advantageously, hydrogen gas may be stored in the first portion of the chamber. Preferably, the second portion of the chamber comprises a vent configured to allow gas in the second portion to vent to the atmosphere. The vent preferably comprises a pressure safety valve or a pressure rupture valve. Advantageously, the second chamber can vent to the atmosphere if the pressure rises above a predetermined maximum pressure.

Preferably, the first portion of the chamber comprises an outlet comprising a valve. The valve may comprise a back-pressure regulating valve. Advantageously, the outlet allows a user to selectively remove hydrogen gas from the chamber.

The inventors believe that their use of the electrolyte is novel and inventive per se.

Accordingly, in accordance with a third aspect, there is provided use of an electrolyte for producing hydrogen, wherein the electrolyte comprises an aqueous alkaline solution comprising a transition metal ion or p block metal ion, wherein the concentration of the transition metal ion or p block metal is between 0.01 M and 1.2 M.

In accordance with a fourth aspect, there is provided use of the electrolysis cell of the first aspect or the apparatus of the second aspect to produce hydrogen.

Advantageously, the apparatus can be used to replace the current "high-temperature" (700° C.-2,000° C.) endothermic reactions associated with "thermochemical water splitting cycles". The electrochemical cell of the first aspect, and the apparatus of the second aspect, may be used efficiently at room temperature, and so can replace the highly endothermic processes currently used in the thermochemical water splitting industry. This could considerably decrease the overall cost of producing $H_2$ thereby making the overall process comparable with the current reforming technologies using fossil fuels.

The hydrogen can be used as a fuel, and could be used to power a car. Alternatively, since the cell can be powered using alternative energy sources, such as solar or wind, the apparatus could be used to generate hydrogen in a remote location which may not be connected to a power grid.

Furthermore, the hydrogen could be used as a reactant, for instance in a chemical laboratory.

In accordance with a fifth aspect, there is provided a method of producing hydrogen, the method comprising applying a voltage across electrodes, wherein the electrodes comprise a cathode and a spaced apart anode and are at least partially disposed in an electrolyte comprising an aqueous alkaline solution comprising a transition metal ion or p block metal ion and the anode comprises at least a layer of a transition metal or p block metal.

Preferably, the method of the fifth aspect uses the apparatus of the first or second aspect.

Preferably, the transition metal or p block metal of the anode is the same metal as the transition metal ion or p block metal ion in the electrolyte.

The method may comprise a primary step of applying a voltage across the electrodes wherein the electrodes are at least partially disposed in the electrolyte, and thereby causing a layer of the transition metal or p block metal to form on the cathode. The method may then comprise switching the electrodes. Advantageously, the electrode with the layer of the transition metal or p block metal is now the anode. Switching the electrodes may comprise switching the direction of the current.

It may be appreciated that this primary step may cause oxygen gas to be generated. Accordingly, the method may comprise venting the oxygen gas produced in the primary step.

The method may comprise adding water to the electrolyte to maintain the concentration of the transition metal ion or p block metal ion dissolved therein. Accordingly, the method may comprise monitoring the volume of hydrogen gas produced and adding 1 ml of water to the electrolyte for every 1244 cm$^3$ of hydrogen gas produced.

The method may comprise switching the electrodes. The electrodes may be switched after a predetermined period. Alternatively, the method may comprise monitoring the rate of hydrogen production and/or the current and switching the electrodes when a drop in the rate of hydrogen production and/or the current is observed. Preferably, the method comprises monitoring the current, and switching the electrodes when a drop in the current is observed. Switching the electrodes may comprise switching the direction of the current.

The method may comprise transporting the hydrogen gas produced to a hydrogen gas store. The hydrogen gas store may be as defined in the second aspect. The method may comprise displacing a liquid disposed in the hydrogen gas store with the hydrogen gas.

All features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

EXAMPLE 1

Figure 1A:
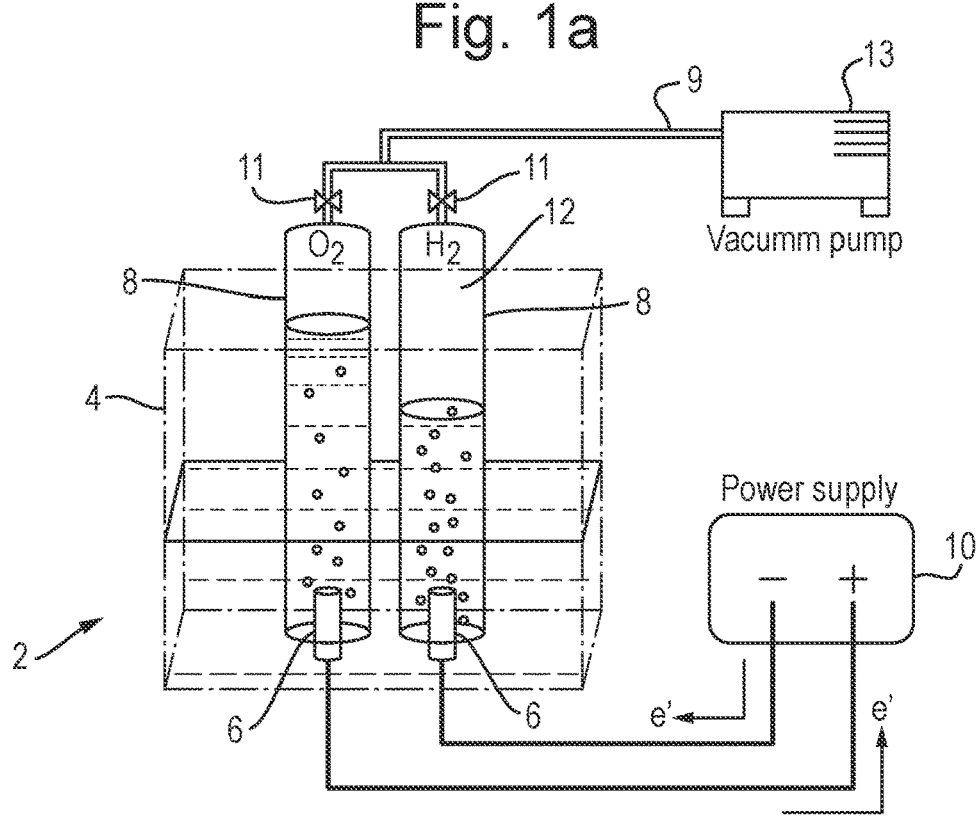
FIG. 1a is a schematic diagram of the experimental set-up for an electrolysis cell.
Figure 1B:
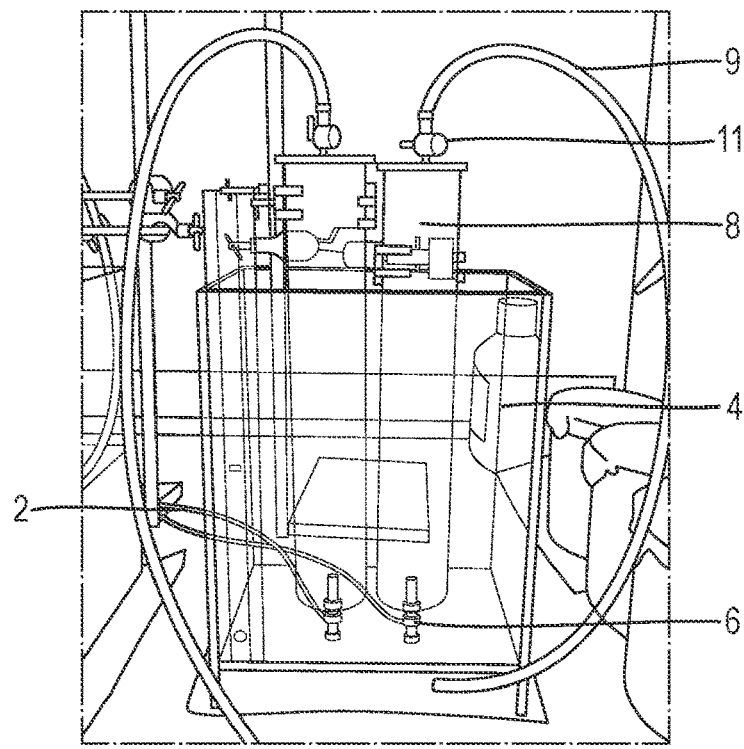
FIG. 1b is a photo of the experimental set-up.

Production of Hydrogen Gas Using Graphite Electrodes and an Electrolyte Comprising Sodium Zincate Materials and Methods
Apparatus Batch experiments were carried out in a closed electrolysis cell 2, shown in FIG. 1. The cell 2 comprised a rectangular acrylic (Perspex) container 4 which was 25 cm high with a length and width of 20 cm×12 cm. This ensured enough capacity to contain different volumes of solution for all of the experiments. Cylindrical graphite electrodes 6 were utilised which were 1 cm in diameter and 3 cm in height. Each electrode 6 was attached to the base of the container 4, and the electrodes were spaced apart by 3 cm. A 1 litre gas collecting tube 8 was placed over each electrode 6 to capture hydrogen gas 12 produced in the experiment. A scale on the side of the tubes 8 allowed the volume of hydrogen gas produced to be measured.

Nylon tubing 9 was connected to the top of the tubes 8, allowing them to be filled with an electrolyte using a vacuum pump 13 prior to the start of an experiment. Valves 11 could then be closed ensuring that any gas collected during the experiment would remain in the tubes.

A conventional DC power supply (DIGIMESS HY3010, 0-30V/0-10 A) 10 was used to apply voltage to the system.
Experimental Procedure Sodium zincate solution (0.59 mole/litre) was prepared by first dissolving 660 g sodium hydroxide pellets (certified grade Sigma-Aldrich, 06203, 98% purity) in 1386 ml of distilled water. This would cause an exothermic reaction which would raise the temperature of the solution in which 66 g zinc oxide powder (certified grade Honeywell, 205532, 99.9% purity) was dissolved. Accordingly, the zinc oxide reacted with the sodium hydroxide solution according to the following formula:

$$ZnO_{(s)} + 2NaOH_{(aq)} \rightarrow Zn(OH)_{2(aq)} + Na_2O_{(aq)} \qquad 1$$

The sodium oxide then reacts with the water like so:

$$Na_2O_{(aq)} + H_2O_{(l)} \rightarrow 2NaOH_{(aq)} \qquad 2$$

The excess NaOH that is available in the solution is used to dissolve the $Zn(OH)_2$ to form a pseudo compound which can be labelled as sodium zincate, $Na_2Zn(OH)_4$, like so:

$$Zn(OH)_{2(aq)} + 2NaOH_{(aq)} \rightarrow Na_2Zn(OH)_{4(aq)} \qquad 3$$

It has not yet been ascertained which compounds form under the influence of zinc hydroxide on strong bases. Some reports have denied the existence of sodium zincate on the grounds of conductivity measurements and have speculated that $Zn(OH)_2$ in NaOH instead forms a colloidal solution.

Analysis by Reichle et al [7] using Atomic Absorption Spectrophotometer have postulated the solubility of zinc hydroxide in NaOH can be interpreted in terms of $Na_2Zn(OH)_4$ in equilibrium with saturated solution that contain species which can be represented by $Zn^{2+}_{(aq)}$, $Zn(OH)^+_{(aq)}$, $Zn(OH)_{2(aq)}$, $Zn(OH)_3^-_{(aq)}$ and $Zn(OH)_4^{2-}_{(aq)}$.

The solution would then be diluted with distilled water to achieve the desired zinc hydroxide concentrations.

The solution was poured into the electrolysis cell 2 and the two gas collecting tubes 8 were used to capture the hydrogen gas. A voltage was then applied which caused the following reactions to occur at the cathode:

$$Zn(OH)_{2(aq)} + 2e^- \rightarrow Zn_{(s)} + 2OH^-_{(aq)} \quad E = -0.828 \text{ V} \quad \quad 4$$

and:

$$2H_2O_{(l)} + 2e^- \rightarrow H_{2(g)} + 2OH^-_{(aq)} \quad E = -1.249 \text{ V} \quad \quad 5$$

Similarly, the following reaction occurred at the anode:

$$4OH^-_{(aq)} \rightarrow O_{2(g)} + 2H_2O_{(l)} + 4e^- \quad E = -0.4 \text{ V} \quad \quad 6$$

Accordingly, the overall reaction can be written as:

$$Zn(OH)_{2(aq)} \rightarrow Zn_{(s)} + H_{2(g)} + O_{2(g)} \quad \quad 7$$

The reversible potential E°, or equilibrium cell voltage, defined as the equilibrium potential difference between the anode and cathode is −1.677 V for this set of reactions. Due to cell resistance, the inventors found that the minimum operational was 1.9 V. To ensure the reaction proceeded at a reasonable rate, the inventors used a voltage of 2.5 V.

Deposition of a uniform layer of zinc on the cathode was observed due to the reduction of zinc hydroxide according to equation 4. After four hours the inventors found that the layer of zinc was sufficient to proceed to the next stage. At this point the electrodes were switched, by swapping the two (+/−) ports on the power supply. Batch experiments could then be carried out. The experiments were run at 2.2 V, 2.0 V and 1.8 V for each concentration.

As indicated in equation 6 oxygen gas is produced at the anode. This then reacts with the zinc layer, like so:

$$2Zn_{(s)} + O_{2(g)} \rightarrow 2ZnO_{(s)} \quad \quad 8$$

The zinc oxide then reacts with the sodium hydroxide in the solution according to equations 1 to 3 to give a solution containing zinc hydroxide and/or sodium zincate. This will react at the cathode according to equation 4. Accordingly, the following process is occurring:

$$Zn_{(s)} + 2H_2(O) \rightarrow Zn(OH)_{2(aq)} + H_{2(g)} \quad \quad 9$$

All measurements were collected manually by reading of the scale on the gas collecting tubes 8 to determine the volume of hydrogen gas released and logging the electrical current. Readings were taken in 5 minute intervals to monitor the hydrogen production over time.

The solution was mixed regularly using a glass rod to ensure uniform gradient of zinc hydroxide. When suspended zinc solids were observed in the solution, creating a deviation from the intended concentration, the solids were removed and replaced with the equivalent molar amount of zinc oxide power. Alternatively, smaller quantities of suspended zinc were swept towards the anode, causing it to oxidise to form zinc hydroxide, according to equation 8.

It was important to track the amount of water consumed in the electrolysis cell. Since water is dissociated to produce hydrogen the concentration of the solution will change as the electrolysis progresses as water is dissociated to produce hydrogen and oxygen gas. The amount of water that is used is calculated based on the cumulative hydrogen produced, as that was the only gas that could be measured. To maintain the concentration of sodium zincate in the solution, 1 ml of water was added for every 1244 cm³ of hydrogen gas produced.

Electrode Switching

Figure 2A:
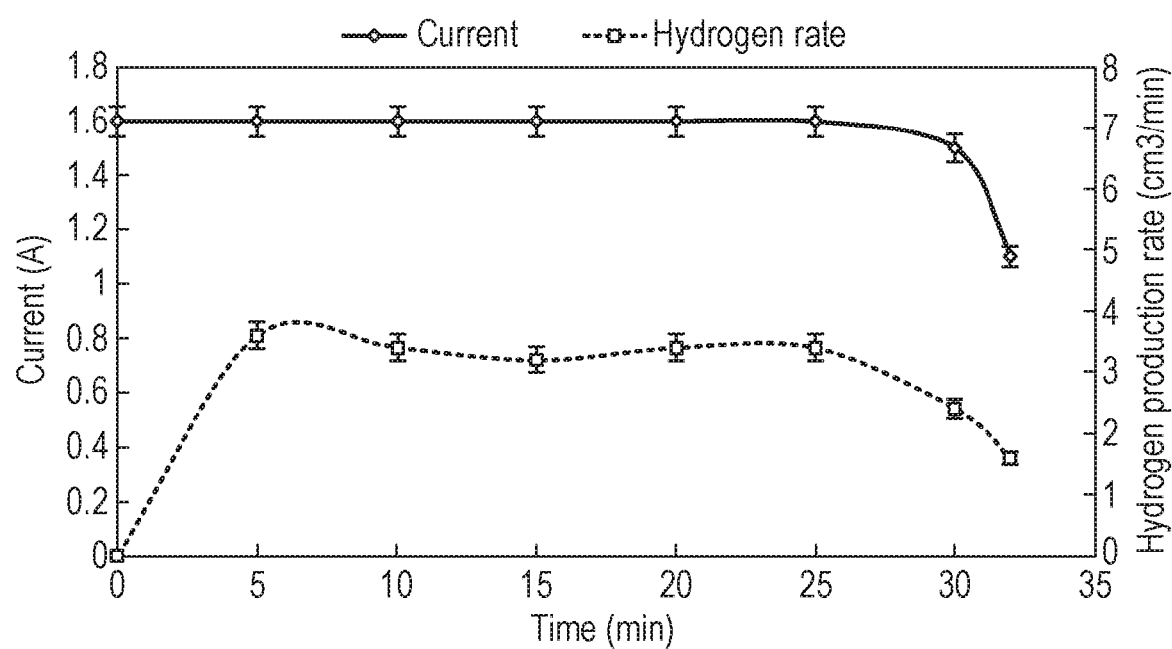
FIG. 2a is a graph showing the change in hydrogen production rate and current over time.
Figure 2B:
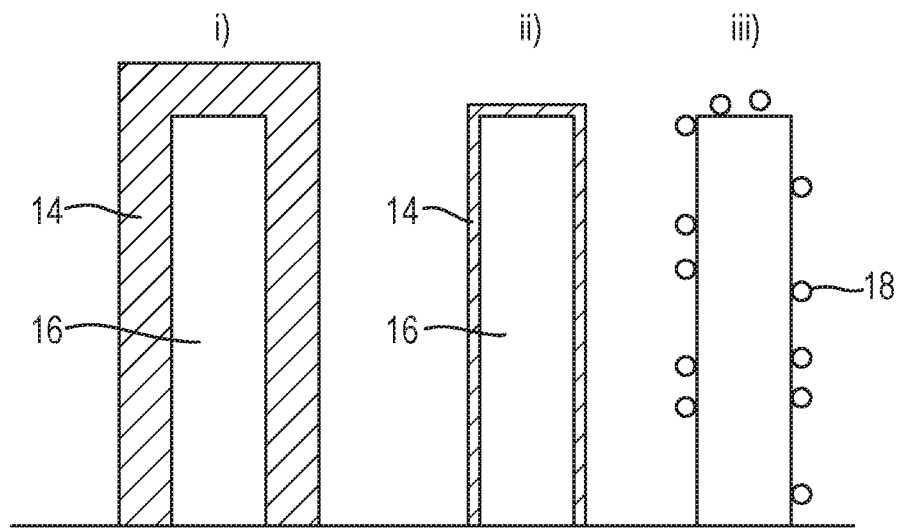
FIG. 2b is a schematic diagram showing how the zinc layer on the anode changes with time.

As indicated in equation 8, above, as the electrolysis reaction progresses the zinc 14 disposed on the anode 16 reacts with oxygen 18 to produce zinc oxide. Accordingly, the layer of zinc 14 on the anode 16 is reduced as the reaction progresses. FIG. 2b(i) shows the anode 16 at the start of a reaction with a thick layer of zinc 14 disposed on its outer surface. FIG. 2b(ii) shows the anode 16 after the electrolysis reaction has been run for some time, it will be noted that the layer of zinc 14 has been substantially decreased. Finally, FIG. 2b(iii) shows the anode 16 after the electrolysis reaction has been run for an even longer period of time, and the layer of zinc 14 has been completely depleted. Accordingly, oxygen bubbles 18 are now forming on the anode 16 in accordance with equation 6. The inventors have noted that when the layer of zinc is depleted then the observed current and the rate of hydrogen production decrease, as shown in FIG. 2a.

However, while the layer of zinc 14 is being depleted on the anode 16, a further layer of zinc 14 will be being deposited on the cathode, according to equation 4. Accordingly, once the level of zinc on the anode 16 was depleted, the inventors could switch the electrodes by swapping the two (+/−) ports on the power supply. The new anode would then have a layer of zinc disposed thereon.

There were several observable indicators to suggest the time of switching the electrodes, namely the drop in the current, the decrease in the hydrogen production rate and the increase in the oxygen production rate. In theory these indicators are expected to appear at the same time. However, it was important to have one main indicator to ensure consistency. Accordingly, the level of the current was used as the main indicator to switch the electrodes. The inventors observed that once the layer of zinc 14 becomes so thin that some areas of the anode 16 are exposed to the solution then current begins to drop rapidly, and it was at this point the inventors switched the electrodes.

It will be appreciated that the switch time varied between experiments due to changes in the applied voltage and the concentration of the solution. Accordingly, the inventors predicted at what time they expected the current to drop, but also maintained live observation of the current so that as soon as any drop in current was detected and the electrodes were switched. This approach ensured that a consistent standard was maintained.

Results and Discussion

Effect of Sodium Zincate Concentration

Figure 3:
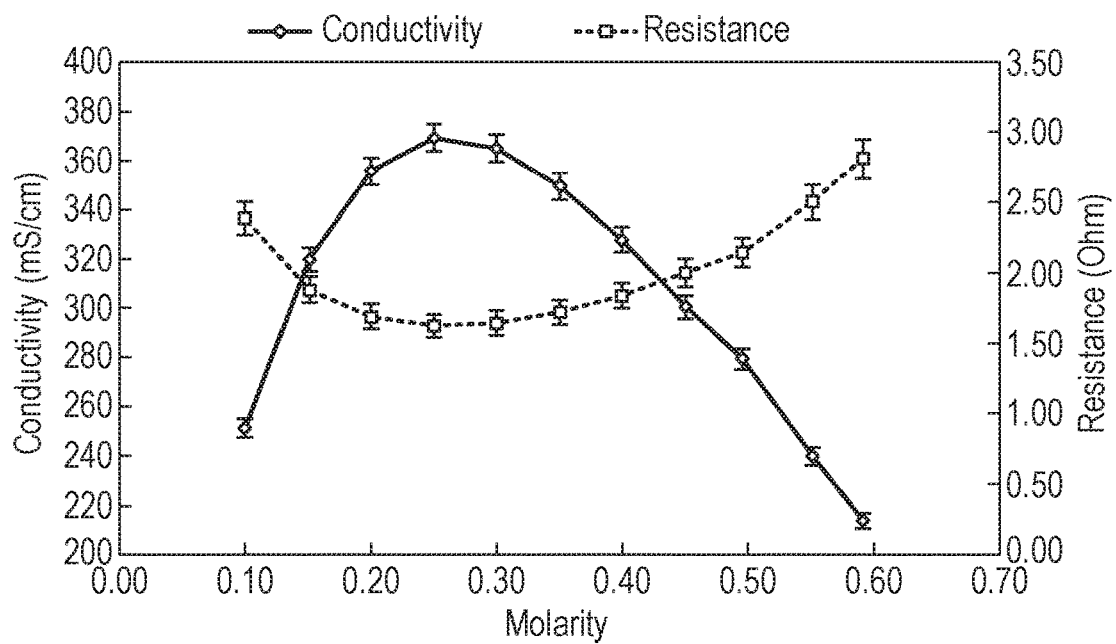
FIG. 3 is a graph showing the conductivity and resistance of the electrolyte as a function of concentration of sodium zincate in an aqueous solution.

Ionic transfer within the solution depends on the concentration of the solution and distance between the electrodes. The ionic resistance can be minimised by reducing the gap between the electrodes 6. The smallest practical distance using the equipment shown in FIG. 1 was 3 cm as this left room for the gas collecting tube 8 to be accommodated. The ionic resistance of the solution depends on concentration of the ions therein and can be estimated by measuring the conductivity of the solution. The direct relationship between conductivity and resistance is given by the equation $R = l/\sigma A$, where R is the electrical resistance, $\sigma$ is the electrical conductivity, l is the length and A is the area. In the experimental set-up l was 0.6 cm and A was 1 cm². Therefore the effect of changing the concentration of the sodium zincate solution on the resistance can be analysed. The result of this is illustrated in FIG. 3.

Ionic transfer is controlled by convective mass transfer in the solution. At lower concentrations (<0.25M), the conductivity is low due to the solution becoming heavily diluted resulting in a decrease in the number of ions. Conversely, at higher concentrations, the conductivity also decreases because of less mobility of the ions due to higher viscosity of the solution and also the formation of neutral ion-pairs not contributing to the overall cell conductivity. Accordingly, the optimum concentration for the solution is around 0.25M.

Figure 4:
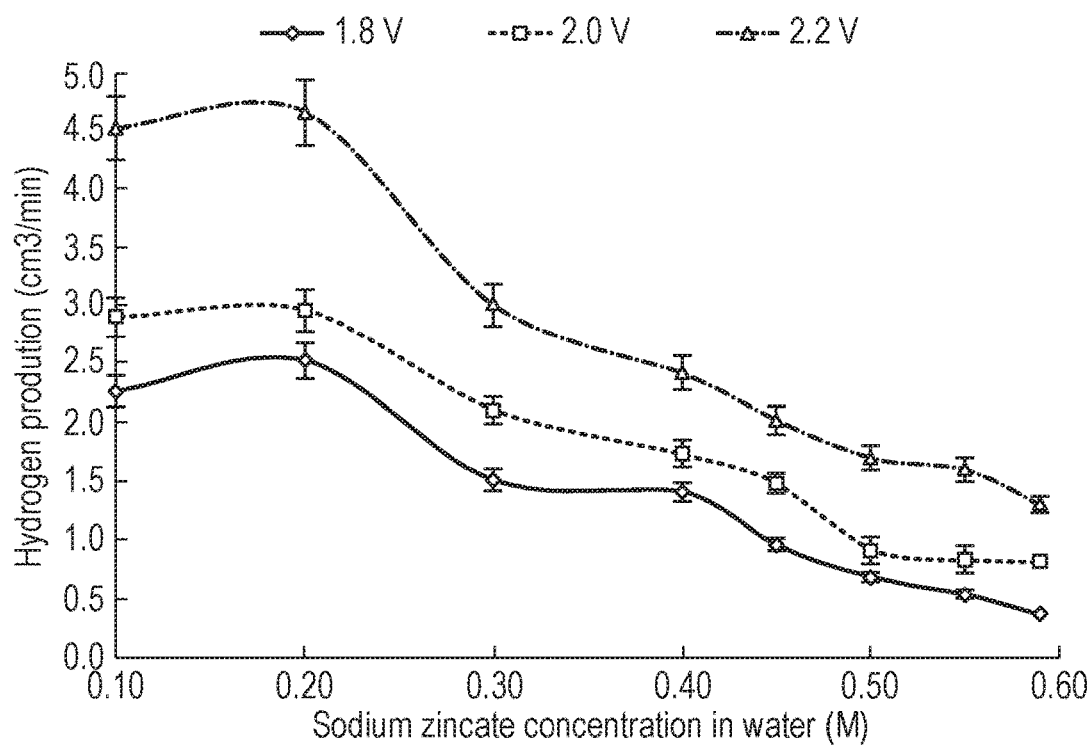
FIG. 4 is a graph showing the hydrogen production versus the concentration of sodium zincate at 1.8 V, 2.0 V and 2.2 V for an electrolysis system using graphite electrodes.

The ability to sustain a passage of electrical current by the electrolyte solution depends on the mobility of its constituent charged ions in the electric field between electrodes immersed in the electrolyte. Better ion mobility leads to higher reaction rates that in turn increases hydrogen production rate. Accordingly, the inventors also analysed the hydrogen production rates at different concentrations, and the results are shown in FIG. 4.

The highest hydrogen production rate observed was at 0.2M, and the trends for all three voltages suggests that the optimum concentration is between 0.1 M and 0.3 M. Below this concentration, the hydrogen production decreases as the solution becomes heavily diluted and the availability of zinc hydroxide ions at the electrode and electrolyte interface is restricted. Similarly, above this concentration, neutral ion-pairs form and these will not be drawn to the electrodes.

Effect of Voltage

The effect of the applied operating cell voltage on the hydrogen production was experimented by tuning the voltage for each experiment.

The hydrogen production increases at higher voltages as it increases the electrolysis process. The relationship between the cell voltage and current characterises the electrochemical behaviour of an electrolysis cell. The hydrogen produced in electrolysis is proportional to the amount of charge involved in the process. Therefore, according to Faraday's law the hydrogen production is directly proportional to the charge transfer, that is, the electric current. Hence when the voltage is tuned on the power supply, electric charge delivered to the electrolysis process by the power supply affects the current. Therefore by increasing the voltage, current density also increases resulting in higher hydrogen production rates as shown in Table 1.

TABLE 1

Current density at different voltages shown for all concentrations

| Concentration (M) | Average current Density (A/cm²) | | |
|---|---|---|---|
| | 2.2 V | 2.0 V | 1.8 V |
| 0.59 | 0.11 | 0.09 | 0.09 |
| 0.55 | 0.13 | 0.11 | 0.11 |
| 0.5 | 0.15 | 0.15 | 0.15 |
| 0.45 | 0.19 | 0.19 | 0.17 |
| 0.4 | 0.19 | 0.16 | 0.14 |
| 0.3 | 0.22 | 0.18 | 0.14 |
| 0.2 | 0.25 | 0.21 | 0.18 |
| 0.1 | 0.18 | 0.18 | 0.11 |

Using lower voltages is desirable, as it allows for greater energy efficiency. Due to the zinc layer covering the graphite electrode, the cell can operate at lower voltage than would otherwise be possible. For instance, the rate of hydrogen production was high when a voltage of 1.8 V was used. However, as explained above, when the anode did not comprise a zinc layer, a minimum voltage of 1.9 V was necessary to simply allow the reaction to proceed at all. Similarly, in industry water electrolysis needs the minimum voltage of 2.0V for hydrogen generation for current densities between 0.1-0.3 A/cm² [8].

Effect of Current Density

Figure 5:
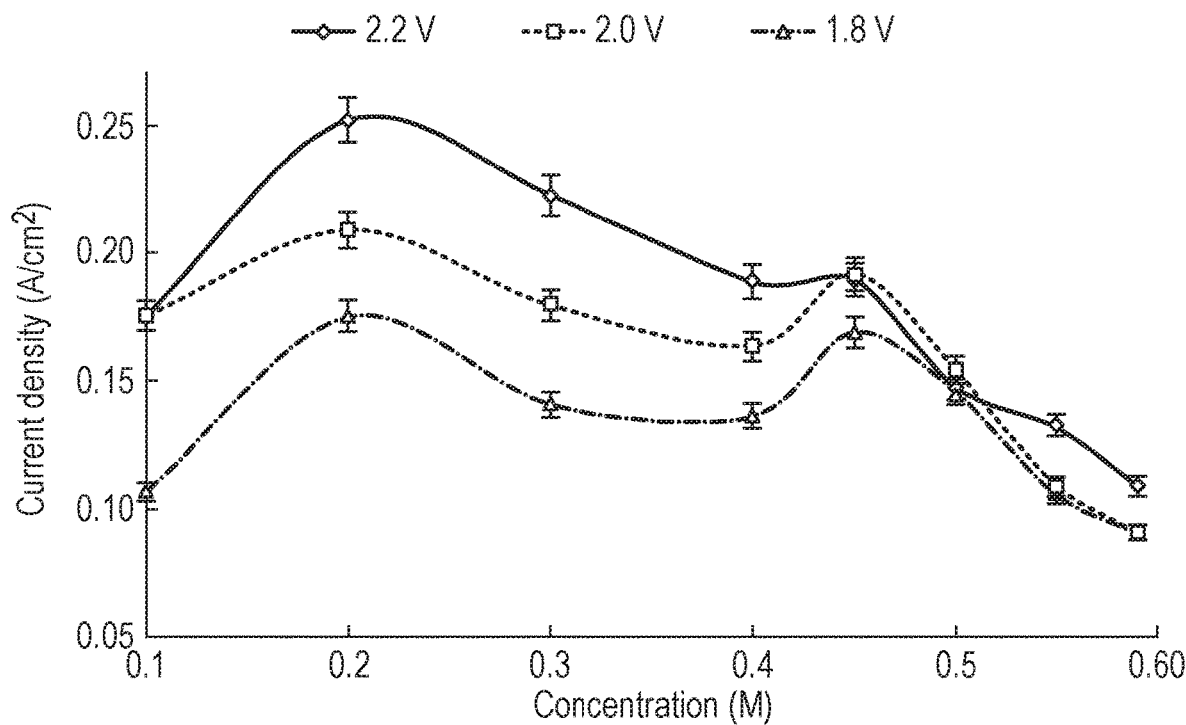
FIG. 5 is a graph showing the current density versus the concentration of sodium zincate at 1.8 V, 2.0 V and 2.2 V for an electrolysis system using graphite electrodes.

It will be appreciated that hydrogen production rate is dependent on the current density in the electrolysis cell. Accordingly, the inventors investigated how the current density changed with the concentration of sodium zincate, and the results are shown in FIG. 5.

It will be noted that the trends observed for the average current density vs concentration closely reflects the trends observed for rate of hydrogen production vs concentration, confirming the relationship between hydrogen production and current density. In particular, the maximum average current density was observed at a concentration of 0.2M, the same concentration that the maximum hydrogen production rate was observed.

The current decreases over time as the zinc layer becomes thicker on the electrode. This increases the resistance which are of two components; the resistance of the electrode and the resistance of the electrolyte. The thick zinc layer on the electrode causes an increase in resistance at the electrode and electrolyte interface which means the freshly formed zinc hinders the evolution of hydrogen, or the availability of zinc hydroxide ions at the interface is restricted suspending the electrochemical reaction. The cell responds by decreasing the current resulting in lower rates of hydrogen production.

Electrode Material and Surface Condition

Selection of the correct electrode material is important for efficient operation of the electrolysis cell. The electrode material was selected to be graphite based as this was understood to provide adequate strength and stability against physical attacks such as erosion by the alkaline solution. At first, the electrodes had a smooth surface. However, when the electrodes were subject to long hours of applied voltage they corroded leaving a slightly porous surface. Repeating the initial experiments determined what effect this change had.

Figure 6:
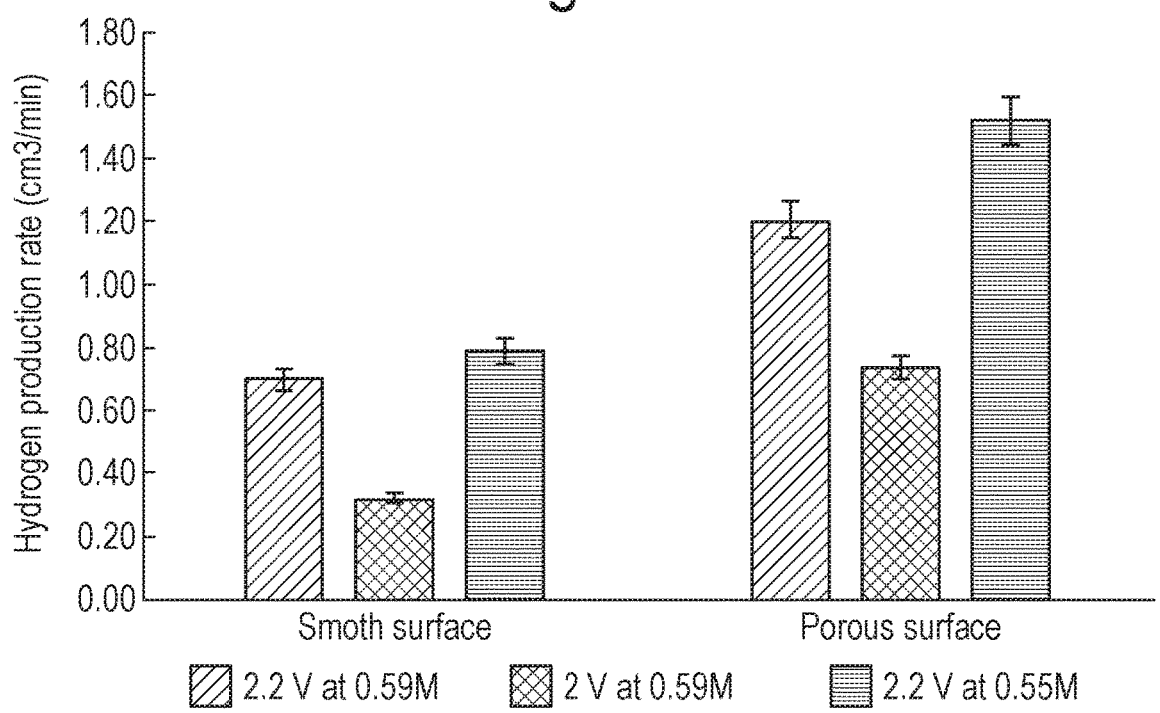
FIG. 6 is a graph showing the effect of the graphite electrode surface on hydrogen production rate.

As shown in FIG. 6, an increase in hydrogen production rate was observed when the electrodes had a porous surface. In fact, an average increase of 96% was observed for same voltage and electrolyte concentration as when performed on a smooth surface. This is due to larger surface area of the electrodes. Accordingly, porous electrodes are advantageous.

Cell Efficiency

Direct comparison of electrolyser technologies can be made by comparing the energy efficiency of the different technologies. This considers the hydrogen production rate at unit volume electrolysis cell against the total electrical energy applied to the cell [8], as given in the following formula:

$$\eta_{H_2 Production\ rate} = V_{H_2}/(Uit) \qquad 10$$

where $V_{H_2}$ is the hydrogen production rate at unit volume electrolysis cell;
U is the cell voltage;
i is the cell current; and
t is time.

The units of $\eta_{H_2\ Production\ rate}$ are $m^3 m^{-3} h^{-1} kWh^{-1}$. The initial $m_3$ comes from the volume of the electrolysis container/electrolyte, the $m^{-3}h^{-1}$ comes from the rate of hydrogen production and the $kWh^{-1}$ comes from the amount of electrical power used.

The values obtained when the electrolyte comprised 0.2M sodium zincate are given in table 2 below.

TABLE 2

Hydrogen production rate at unit volume electrolysis cell against the total electrical energy applied to the cell at various voltages at 0.2M sodium zincate with graphite electrodes

| Voltage/V | Hydrogen production rate at unit volume electrolysis cell against the total electrical energy applied to the cell/$m^3m^{-3}h^{-1}kWh^{-1}$ |
| --- | --- |
| 1.8 | 19.5 |
| 2 | 9.3 |
| 2.2 | 6.3 |

The cell is considered inefficient if high voltage is required to produce the same hydrogen mass while keeping the current constant. As shown in the table above, the obtained value for this system at 2.2V is 6.3 $m^3m^{-3}h^{-1}kWh^{-1}$, conversely a value of 2.3 $m^3m^{-3}h^{-3}Wh^{-1}$ is typical for water electrolysers [9]. Accordingly, the cell developed by the inventors has a greater hydrogen production performance compared to conventional water electrolysers as less power is required to produce hydrogen.

Conclusion

A practical alkaline water electrolysis cell with graphite electrodes has been constructed for exploring hydrogen production using a zincate solution as an electrolyte. Optimum conditions for operation were investigated by analysing the influences of applied voltage, current and sodium zincate concentration. The experimental results show that the hydrogen production peaked at about 0.2M. Increasing the voltage also increased the hydrogen production rate. Furthermore, the formation of porous graphite surface was another factor which positively affected the hydrogen production rate.

The results demonstrate a significant hydrogen production at low voltages indicating greater energy efficiency and reducing energy per mass unit of hydrogen produced by a factor of 2.7 compared to conventional water electrolysis systems. Since the experiments represent the feasibility stage, there is further potential for the system to be optimised to achieve greater efficiency.

EXAMPLE 2

Production of Hydrogen Gas Using Zinc Electrodes and an Electrolyte Comprising Sodium Zincate Materials and Methods The apparatus described in Example 1 was modified by replacing the graphite electrodes with zinc electrodes [2.4 cm (h)×0.9 cm (d)]. The electrodes were covered with 0.5 cm of a polyethylene hose at the base to protect the base from corrosion.

As described in Example 1, the electrodes were switched when a decrease in current was observed. However, unlike Example 1, a delay in the hydrogen production was observed. Without wishing to be bound by theory, the inventors hypothesize that this could be due to oversaturation of the electrode. To counter this, when the ports were switched the voltage was increased to 10-12 Amps until there was a hydrogen bubble and then the voltage was decreased to the desired voltage. This was noted in the results as in some cases, there was no or small amounts of hydrogen produced in the first 5 minutes. The current also decreased and the hydrogen production rate increased as this oversaturation was overcome.

Apart from these differences, the apparatus and experimental method were as described in Example 1.

Results and Discussion

Effect of Sodium Zincate Concentration

Figure 7:
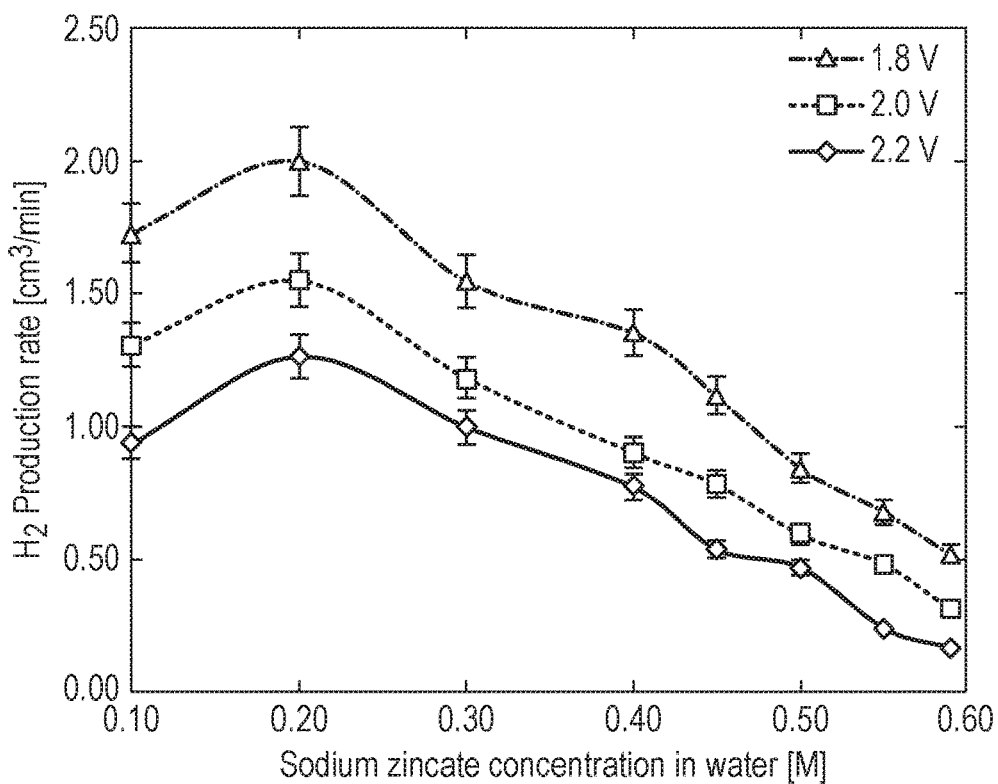
FIG. 7 is a graph showing the hydrogen production versus the concentration of sodium zincate at 1.8 V, 2.0 V and 2.2 V for an electrolysis system using zinc electrodes.

The hydrogen production rates at different concentrations are shown in FIG. 7. Again, the highest hydrogen production rate observed was at 0.2M, and the trends for all three voltages suggests that the optimum concentration is between 0.1 M and 0.3 M.

Effect of Voltage

Similarly, the inventors found that the cell could operate at low voltages.

TABLE 3

Current density at different voltages shown for all concentrations (sodium zincate/zinc electrode)

| Concentration (M) | Average current Density (A/cm²) | | |
| --- | --- | --- | --- |
| | 2.2 V | 2.0 V | 1.8 V |
| 0.59 | 0.13 | 0.12 | 0.11 |
| 0.55 | 0.15 | 0.13 | 0.12 |
| 0.5 | 0.16 | 0.15 | 0.12 |
| 0.45 | 0.18 | 0.16 | 0.13 |
| 0.4 | 0.19 | 0.18 | 0.15 |
| 0.3 | 0.20 | 0.19 | 0.16 |
| 0.2 | 0.23 | 0.20 | 0.18 |
| 0.1 | 0.18 | 0.16 | 0.13 |

Effect of Current Density

Figure 8:
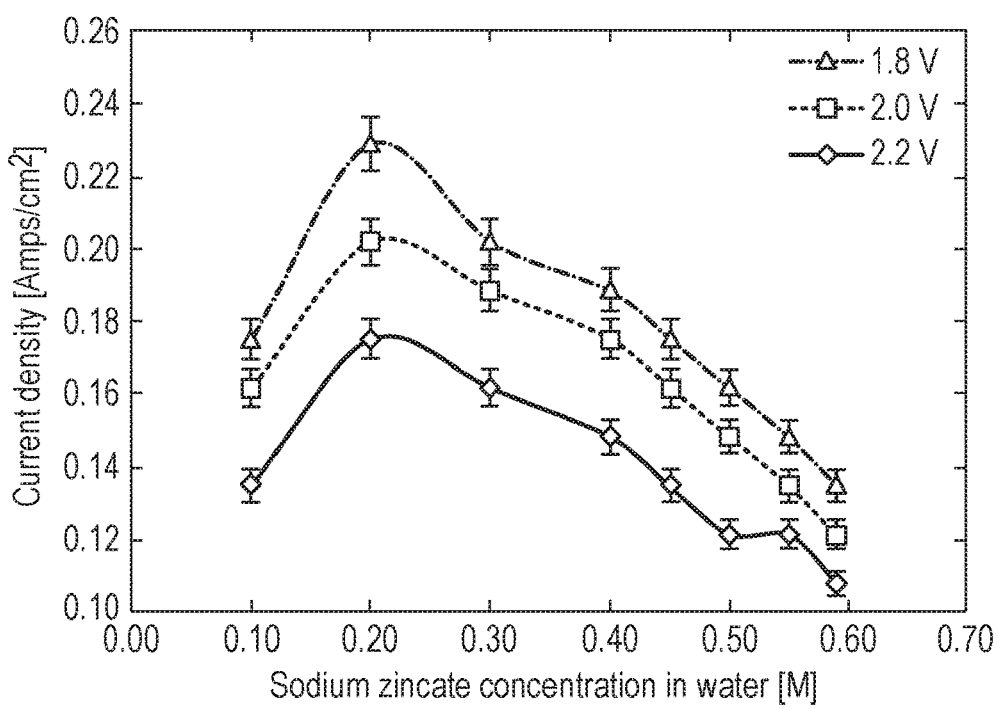
FIG. 8 is a graph showing the current density versus the concentration of sodium zincate at 1.8 V, 2.0 V and 2.2 V for an electrolysis system using zinc electrodes.

As with the graphite electrodes, the inventors investigated how the current density changed with the concentration of sodium zincate, and the results are shown in FIG. 8. Again, the maximum average current density was observed at a concentration of 0.2M, the same concentration that the maximum hydrogen production rate was observed.

Cell Efficiency

The cell efficiency was also calculated for this system, and the values obtained are given in Table X below.

TABLE 4

Hydrogen production rate at unit volume electrolysis cell against the total electrical energy applied to the cell at various voltages at 0.2M sodium zincate with zinc electrodes

| Voltage/V | Hydrogen production rate at unit volume electrolysis cell against the total electrical energy applied to the cell/$m^3m^{-3}h^{-1}kWh^{-1}$ |
| --- | --- |
| 1.8 | 13.8 |
| 2 | 13.5 |
| 2.2 | 9.31 |

Conclusion

The alkaline water electrolysis cell described in Example 1 may be used with electrodes comprising materials other than graphite. In particular, the inventors have shown that zinc electrodes may be used effectively, and using these electrodes achieved similar results to those obtained with graphite electrodes. However, it will be appreciated that electrodes comprising alternative materials may also be used.

EXAMPLE 3

Production of Hydrogen Gas Using Graphite Electrodes and an Electrolyte Comprising Potassium Zincate Materials and Methods The apparatus used was as described in Example 1.

Potassium zincate solution (1.25 mole/litre) was prepared by first dissolving 1430 g of potassium hydroxide in 980 ml of distilled water. This would cause an exothermic reaction which would raise the temperature of the solution in which 98 g zinc oxide powder (certified grade Honeywell, 205532, 99.9% purity) was dissolved.

It will be appreciated that the reactions which occurred will be as described in Example 1, except that the sodium would have been replaced by potassium.

Figure 9:
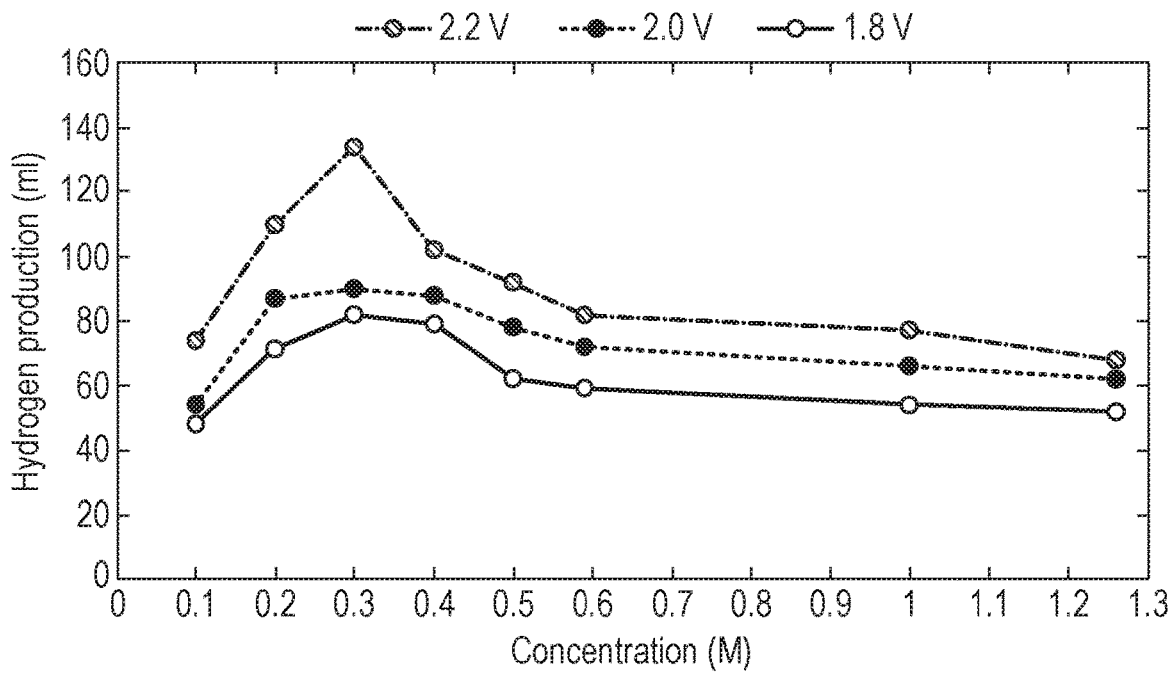
FIG. 9 is a graph showing the hydrogen production versus the concentration of potassium zincate at 1.8 V, 2.0 V and 2.2 V for an electrolysis system using graphite electrodes.

Apart from these differences, the apparatus and method used were as described in Example 1.
Results and Discussion
Effect of Potassium Zincate Concentration The hydrogen production rates at different concentrations are shown in FIG. 9. Unlike Examples 1 and 2, the highest hydrogen production rate observed was at 0.3M, and the trends for all three voltages suggests that the optimum concentration is between 0.1 M and 0.4 M.

TABLE 5

Hydrogen production rate at unit volume electrolysis cell against the total electrical energy applied to the cell at various voltages at 0.3M sodium zincate with graphite electrodes

| Voltage/V | Hydrogen production rate at unit volume electrolysis cell against the total electrical energy applied to the cell/m$^3$m$^{-3}$h$^{-1}$kWh$^{-1}$ |
|---|---|
| 1.8 | 4.07 |
| 2 | 3.64 |
| 2.2 | 3.40 |

Conclusion

The alkaline water electrolysis cell described in Example 1 may be used with alternative electrolytes. In particular, the inventors have shown that a potassium zincate solution can be used. The experimental results show that the hydrogen production peaked at about 0.3M. Again, increasing the voltage also increased the hydrogen production rate.

EXAMPLE 4

Production of Hydrogen Gas Using Zinc Electrodes and an Electrolyte Comprising Potassium Zincate Materials and Methods The apparatus used was as described in Example 2, and the electrolyte used was as described in Example 3.

Figure 10:
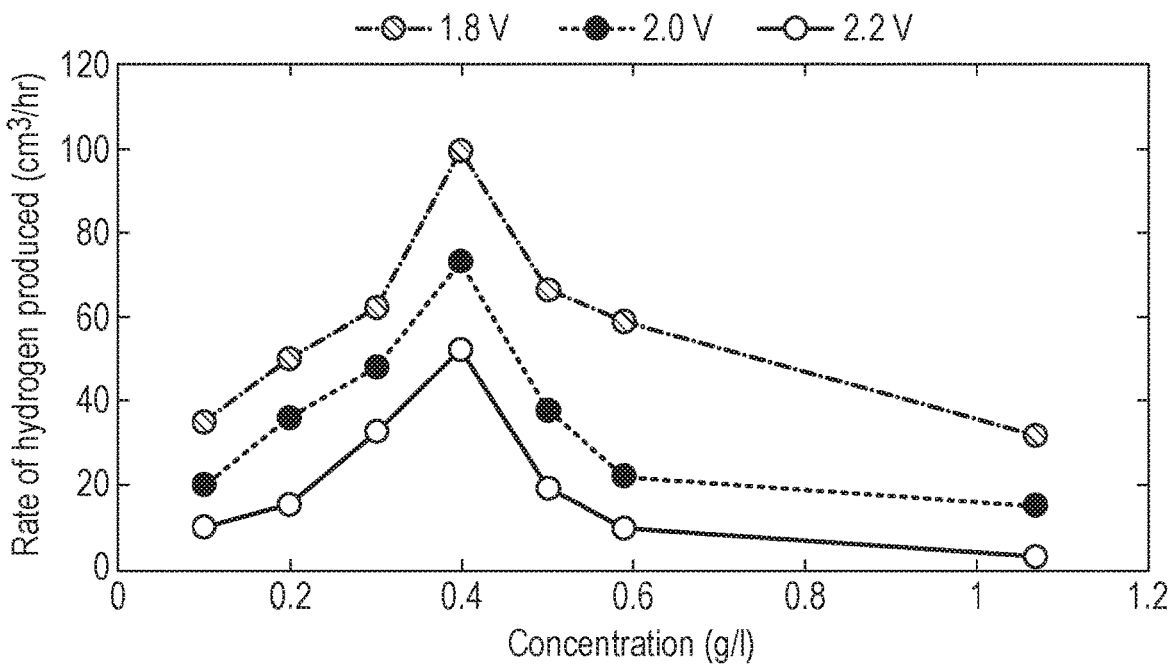
FIG. 10 is a graph showing the hydrogen production versus the concentration of potassium zincate at 1.8 V, 2.0 V and 2.2 V for an electrolysis system using zinc electrodes.

Apart from these differences, the apparatus and method used were as described in Example 1.
Results and Discussion
Effect of Potassium Zincate Concentration The hydrogen production rates at different concentrations are shown in FIG. 10. The highest hydrogen production rate observed was at 0.4M, and the trends for all three voltages suggests that the optimum concentration is between 0.3 M and 0.5 M.

TABLE 6

Hydrogen production rate at unit volume electrolysis cell against the total electrical energy applied to the cell at various voltages at 0.4M sodium zincate with zinc electrodes

| Voltage/V | Hydrogen production rate at unit volume electrolysis cell against the total electrical energy applied to the cell/m$^3$m$^{-3}$h$^{-1}$kWh$^{-1}$ |
|---|---|
| 1.8 | 5.42 |
| 2 | 4.82 |
| 2.2 | 2.84 |

Conclusion

The alkaline water electrolysis cell described in Example 3 may also be used with alternative electrolytes. In particular, the inventors have shown that a potassium zincate solution can be used. The experimental results show that the hydrogen production peaked at about 0.4M. Again, increasing the voltage also increased the hydrogen production rate.

EXAMPLE 5

A Small-Scale Hydrogen Generator

Figure 11:
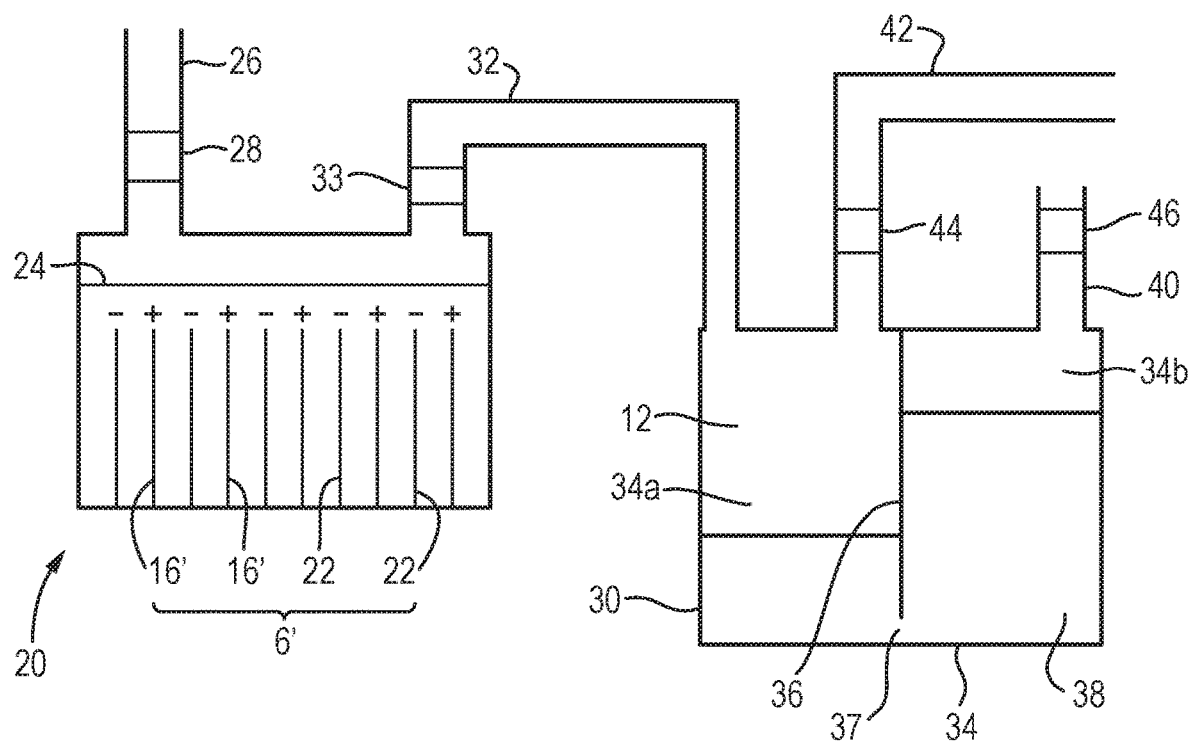
FIG. 11 is a schematic diagram of an embodiment of a hydrogen generator in accordance with the invention.

FIG. 11 shows a small-scale hydrogen generator 20. The generator comprises an electrolysis cell 2' comprising a plurality of graphite electrodes 6'. The electrodes 6' are shown as anodes 16' and cathodes 22. However, it will be appreciated that the cathodes 16' and anodes 22 can be switched as explained above, alternatively an oscillating or alternating current may be used to continuously switch the electrodes.

The generator 20 also comprises an electrolyte solution 24 comprising sodium zincate, as described in example 1, and a conduit 26 allows a user to top up the solution 24 as necessary. A valve 28 disposed in the conduit 26 prevents hydrogen 12 produced in the cell 2' from escaping to the atmosphere.

The generator 20 also comprises a hydrogen store 30. The store 30 comprises a chamber 34 split into two portions 34a and 34b by a separator 36. The portions 34a and 34b are of roughly equal volume. The separator 36 is connected to the top and side walls but leaves a small hole 37 at the base, thereby allowing fluid communication between the two portions 34a and 34b. A liquid 38 is disposed in the chamber 34 fills about half of the volume. The height of the liquid 38 is greater than the height of the gap 37, and thereby prevents gas in the first portion 34a from mixing with gas in the second portion 34b. A vent 40 comprising a pressure safety valve 46 allows gas in the second portion 34b to vent into the atmosphere if the pressure within the chamber 34 exceeds a predetermined level. An operator can access the chamber 34 to replenish the liquid 38 as necessary.

A conduit 42 from the first portion 34a comprising a back-pressure regulating valve 44 allows gas to be selectively removed from the first portion 34a. Ideally, the pressure within the chamber 34 is maintained between 0.5 and 3 barg.

While not shown, it will be appreciated that each electrode 6' could be provided in a separate compartment with an associated conduit comprising valves configured to selectively to the atmosphere when the electrode 6' is producing oxygen gas, and to selectively transport gas to the hydrogen store 30 when the electrode 6' is producing hydrogen gas.

A conduit 32 comprising a solenoid valve 33 extends between the cell 2' and the first portion 34a of the chamber. Accordingly, when the cell 2' is producing hydrogen 12, the valve 33 will be open allowing the hydrogen 12 to flow from the cell 2' to the first portion 34a of the store 30. The hydrogen 12 will displace the liquid 38 in the first portion 34a, and it will flow through the hole 37 into the second portion 34b. The total pressure within the chamber 34 will increase due to the addition of the hydrogen gas.

Accordingly, the hydrogen gas 12 can be stored until it is required by a user, or could continuously supply hydrogen gas at a desired pressure.

REFERENCES

[1] Barreto L, Makihira A, Riahi K. The hydrogen economy in the 21st century: A sustainable development scenario. Int J Hydrogen Energy 2003; 28:267-84.
[2] Da T, Veras S, Mozer T S, Da Costa D, Messeder R, Santos D, et al. Hydrogen: Trends, production and characterization of the main process worldwide 2016; 2:1-16.
[3] Balat M. Potential importance of hydrogen as a future solution to environmental and transportation problems. Int J Hydrogen Energy 2008; 33:4013-29.
[4] Dunn S. Hydrogen futures: Toward a sustainable energy system. Int J Hydrogen Energy 2002; 27:235-64.
[5] de Souza R F, Padilha J C, Goncalves R S, de Souza M O, Rault-Berthelot J. Electrochemical hydrogen production from water electrolysis using ionic liquid as electrolytes: Towards the best device. J Power Sources 2007; 164:792-8.
[6] Dincer I, Acar C. Review and evaluation of hydrogen production methods for better sustainability. Int J Hydrogen Energy 2014; 40:11094-111.
[7] Reichle R a., McCurdy K G, Hepler L G. Zinc Hydroxide: Solubility Product and Hydroxy-complex Stability Constants from 12.5-75° C. Can J Chem 1975; 53:3841-5.
[8] Zeng K, Zhang D. Recent progress in alkaline water electrolysis for hydrogen production and applications. Prog Energy Combust Sci 2010; 36:307-26.
[9] Santos D M F, Sequeira C A C, Figueiredo J L. Hydrogen production by alkaline water electrolysis. Quim Nova 2013; 36:1176-93.

The invention claimed is:

1. An electrolysis cell for producing hydrogen, the cell comprising an electrolyte compartment; an electrolyte disposed in the electrolyte compartment, wherein the electrolyte comprises an aqueous alkaline solution comprising an alkali metal hydroxide or an alkaline earth metal hydroxide and a zinc ion; first and second spaced apart electrodes at least partially disposed in the electrolyte, wherein at least one of the electrodes comprises at least a layer of zinc metal; and a power supply configured to apply a voltage across the first and second electrodes, wherein (a) the power supply is configured to supply a direct current to the electrodes and the cell comprises a control system configured to monitor the current flowing through the electrodes and to switch the direction of the current if it detects that the current has fallen below a predetermined level, or (b) the power supply is configured to apply a continuous alternating or oscillating current to the electrodes.

2. The electrolysis cell according to claim 1, wherein the first and second electrodes comprise graphite, chromium, nickel, zinc, cadmium, copper, tin, lead, rhodium, platinum, gold, palladium, iridium, osmium, rhenium, ruthenium, germanium, beryllium, silver, brass, and/or bronze.

3. The electrolysis cell according to claim 1, wherein the alkali metal or alkaline earth metal hydroxide is from the group consisting of potassium hydroxide, sodium hydroxide, barium hydroxide, caesium hydroxide, strontium hydroxide, calcium hydroxide, lithium hydroxide, and rubidium hydroxide, optionally wherein the ratio of the hydroxide concentration to the zinc ion concentration is between 2:1 and 50:1, between 3:1 and 40:1, between 4:1 and 30:1, between 5:1 and 25:1, or between 10:1 and 20:1.

4. The electrolysis cell according to claim 3, wherein the alkali metal or alkaline earth metal hydroxide is sodium hydroxide and the ratio of hydroxide concentration to the zinc ion concentration is between 10:1 and 15:1.

5. The electrolysis cell according to claim 3, wherein the alkali metal or alkaline earth metal hydroxide is potassium hydroxide and the ratio of hydroxide concentration to the zinc ion concentration is between 15:1 and 20:1.

6. The electrolysis cell according to claim 1, wherein the pH of the aqueous alkaline solution at 20° C. is at least 9, at least 10, at least 11 or at least 11.5 and/or wherein the concentration of the zinc ion in the electrolyte is between 0.01 M and 1.2 M, between 0.05 M and 1 M, between 0.1 M and 0.8 M, between 0.15 M and 0.6 M, or between 0.2 M and 0.4 M.

7. The electrolysis cell according to claim 1, wherein the electrolyte comprises sodium zincate and the concentration of the zinc ion is between 0.01 M and 0.6 M, between 0.1 M and 0.4 M, between 0.15 M and 0.3 M, or between 0.2 M and 0.25 M.

8. The electrolysis cell according to claim 1, wherein the electrolyte comprises potassium zincate and the concentration of the zinc ion is between 0.01 M and 1.2 M, between 0.1 M and 0.6 M, between 0.2 M and 0.5 M, or between 0.25 M and 0.45 M.

9. The electrolysis cell according to claim 1, wherein the power supply is configured to apply a voltage of between 1 V and 6 V, between 1.5 V and 3 V, or between 2 and 2.5 V.

10. An apparatus for generating and storing hydrogen, the apparatus comprising the electrolysis cell of claim 1, a chamber for hydrogen gas storage, and a conduit configured to feed hydrogen gas from the cell to the chamber.

11. The apparatus according to claim 10, wherein the chamber comprises:
a first portion comprising a first gas;
a second portion comprising a second gas; and
a liquid,
wherein the chamber is configured to allow the liquid to flow between the first and second portions and to prevent the first gas in the first portion from exchanging with the second gas in the second portion.

12. The apparatus according to claim 11, wherein the first portion of the chamber comprises an outlet comprising a valve, optionally wherein the valve comprises a back-pressure regulating valve.

13. A method of producing hydrogen, the method comprising:
providing an electrolysis cell, the electrolysis cell comprising:
an electrolyte compartment;
an electrolyte disposed in the electrolyte compartment, wherein the electrolyte comprises an aqueous alkaline solution comprising an alkali metal hydroxide or an alkaline earth metal hydroxide and a zinc ion;
two electrodes, wherein the electrodes comprise a cathode and a spaced apart anode and are at least partially disposed in the electrolyte and the anode comprises at least a layer of zinc metal; and applying a voltage across the two electrodes characterised in that the method comprises applying a continuous alternating or oscillating current to the electrodes or monitoring the rate of hydrogen production and/or the current and switching the direction of the current supplied to the electrodes when a drop in the rate of hydrogen production and/or the current is observed.

14. The method according to claim 13, wherein the method comprises—applying a voltage across the two electrodes, thereby causing a layer of the zinc metal to form on the cathode; and switching the direction of the current supplied to the electrodes to provide the electrolysis cell with an anode comprising the layer of the zinc metal.

15. The method according to claim 13, wherein the method comprises adding water to the electrolyte to maintain the concentration of the zinc ion dissolved therein.

16. The electrolysis cell according to claim 1, wherein the power supply is configured to supply a direct current to the electrodes and the cell comprises a control system configured to monitor the current flowing through the electrodes and to switch the direction of the current if it detects that the current has fallen below a predetermined level.

17. The electrolysis cell according to claim 1, wherein the power supply is configured to apply a continuous alternating or oscillating current to the electrodes.

18. The electrolysis cell according to claim 17, wherein the power supply is configured to apply the continuous alternating or oscillating current in the form of a sine wave, triangle wave, sawtooth wave or square wave.

19. The electrolysis cell according to claim 17, wherein the power supply is configured to apply the continuous alternating or oscillating current at between 0.01 Hz and 100 Hz.

20. The electrolysis cell according to claim 19, wherein the power supply is configured to apply the continuous alternating or oscillating current in the form of a sine wave.

* * * * *